Figure 1:
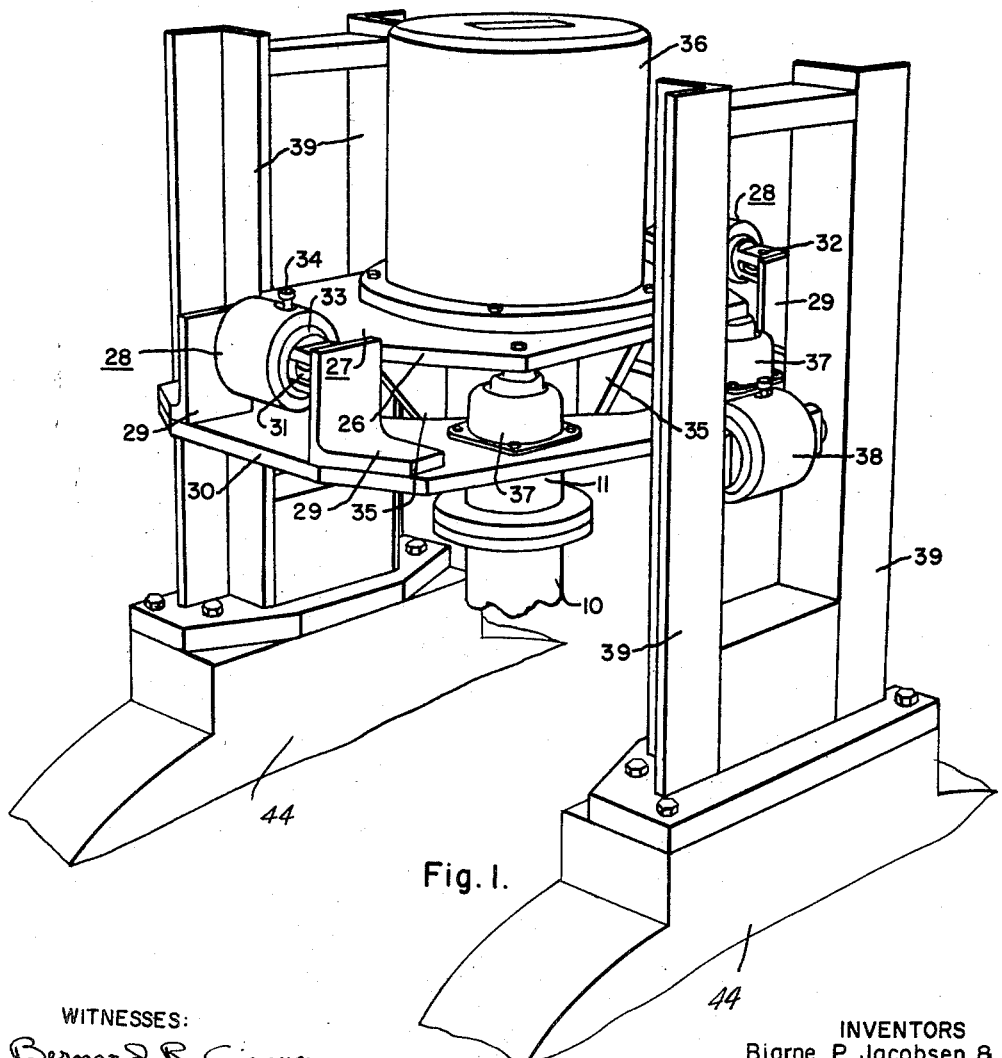

March 19, 1963 B. P. JACOBSEN ETAL 3,081,544
FLOATING DRIVE TAKE OFF
Filed Dec. 10, 1959 3 Sheets-Sheet 1

WITNESSES:
Bernard R. Gieguay
James F. Young

INVENTORS
Bjarne P. Jacobsen &
Leonard R. Hulls.
BY P.J.Brodahl
ATTORNEY

United States Patent Office 3,081,544
Patented Mar. 19, 1963

3,081,544
FLOATING DRIVE TAKE OFF
Bjarne P. Jacobsen and Leonard R. Hulls, Dundas, Ontario, Canada, assignors to Canadian Westinghouse Company, Limited, Hamilton, Ontario, Canada
Filed Dec. 10, 1959, Ser. No. 858,817
Claims priority, application Canada Sept. 11, 1959
4 Claims. (Cl. 33—1)

The present invention relates in general to roller screw down position sensing apparatus for use with a metallic rolling mill or the like and more particularly is concerned with improvements in or relating to mechanical couplings for such position sensing apparatus.

It is often required in the design of a mechanical device to provide a mechanical coupling between a first member capable of both rotation about its axis and displacement along its axis with a second member intended for measuring the extent of the rotation of the first-mentioned member from a predetermined position. A specific example can be found in a metallic rolling mill in which material is reduced in thickness by passing it between two rolls. The output thickness of the material from the rolling mill is a function of among other things, the distance between the rolls when no material is passing between them, as is explained in Canadian Patent No. 571,793, in the name of Leonard Robin Hulls and assigned to the present assignee, and this distance is measured by measurement with a position sensing device such as a signal generator device or transmitter of the rotational positions of a pair of screw members that are connected to a first roll and are rotated to move that first roll relative to the other roll, which usually is kept fixed in position. In order to operate the rolling mill with the required accuracy of strip material output thickness it must be possible to measure with sufficient accuracy rotations of the screws of about six minutes of arc, despite the fact that part of the position signal generator device must not rotate, yet it must be possible to accommodate the longitudinal movement of the associated screw member consequent upon its rotation, and also some displacement of the screw member axis transverse thereto.

It is an object of the present invention to provide an improved mechanical coupling suitable for coupling together such a screw member and a position signal generator.

According to the present invention there is provided a mechanical coupling for coupling together two members, a first one of which is a screwdown member capable of rotation about an axis and displacements with respect to a third support member, and the second of which is a position signal generator capable only of the said displacements, comprising an intermediate support member, guide means associated with the third and intermediate support members to prevent rotation of the intermediate support member about the axis and to permit its displacement relative to the third support member in at least two opposite directions, and guide means associated with the intermediate support member and the second member to prevent rotation of the second member about the axis and to permit its displacement in at least two opposite directions transverse to the first-mentioned two opposite directions, the guide means being effective to permit displacement of the second member relative to the third support member in three pairs of opposite directions, one pair parallel to the axis and the other two pairs transverse to the axis and to one another.

Figure 2:
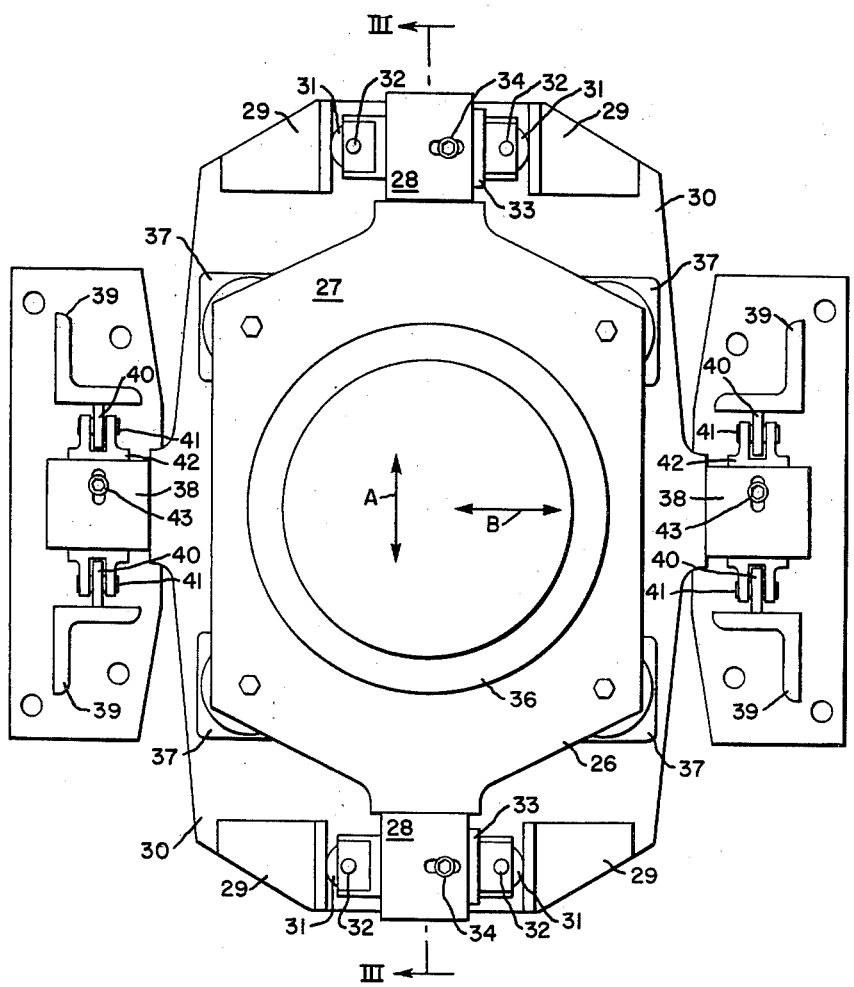

A coupling assembly which is a specific embodiment of the invention will now be described, by way of example, with reference to the accompanying diagrammatic drawings wherein:

FIGURE 1 is a perspective view of the assembly.
FIG. 2 is a plan view of the assembly looking down from above, and
FIG. 3 is a cross-section of the assembly taken partly on the line III—III of FIG. 2.

The coupling assembly to be described herein is used for coupling together a screw-threaded member 10 (the threaded part thereof is not seen in the drawings) that may be connected to a movable roll member not shown and the rotor of a generator capable of producing a signal representative of the relative rotational position of its own rotor and stator, thus representative of the rotational position of the screw member 10, and thus representative of the spacing between a pair of roll members whose spacing is determined by rotation of the member 10. The screw-threaded member is disposed with its axis vertical and moves along the axis as a consequence of its rotation about the axis, the exact position of the axis also changing owing to unavoidable errors in the screw member 10 and in the screw-threaded nut in the rolling mill body in which it works. In a rolling mill two similar screw-threaded members will be provided, one at each end of the shaft of the movable roll member, and each screw member is provided with a respective signal generator. The two resulting position signals are combined in some way to provide a single output signal representative of the roll spacing.

Figure 3:
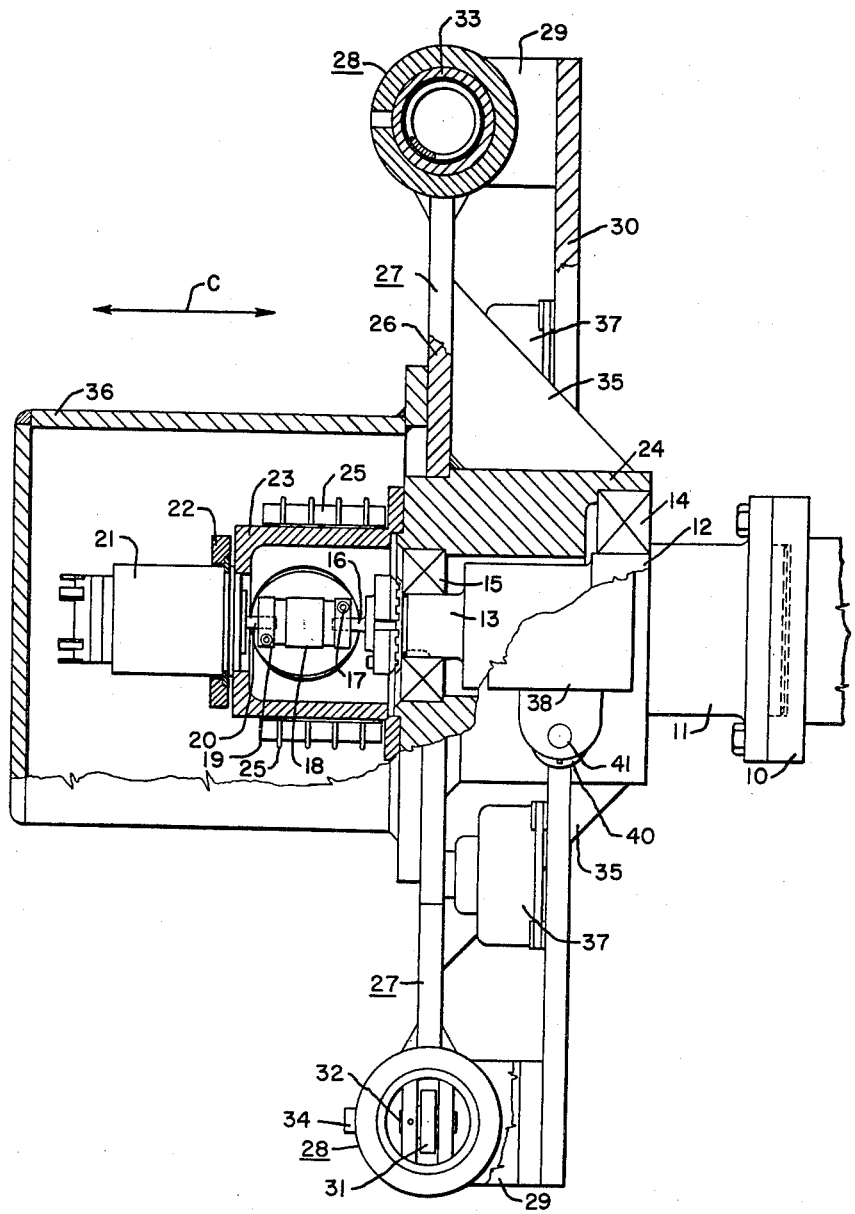

The coupling assembly as shown in FIG. 3 comprises a stub-shaft 11 bolted to the screw member 10 with its longitudinal axis as nearly as practicable coincident with the axis of rotation of the screw member 10; the parts 12 and 13 are of reduced diameter and carry the inner races of bearings 14 and 15 respectively. The stub-shaft 11 terminates in a peg 16 which is bolted thereto, a clamp 17 fixing to the peg one end of a bellows coupling 18 of known type that will transmit rotational movement accurately while permitting limited longitudinal and transverse relative displacements of the coupled members. The other end of the coupling 18 is fixed by a clamp member 19 to the rotor shaft 20 of the respective position signal generator, the stator or housing of which is indicated by 21. The signal generator may have any of the different forms known to those skilled in the art, e.g. a potentiometer or a differential transformer, the choice depending upon such factors as the type and amplitude of the position signal required for feeding to the provided output devices.

The housing 21 is fixed rigidly by a clamp ring 22 to a cup-shaped housing 23, which in turn is fixed rigidly with its mouth opening downwards to a cylindrical body 24 that is mounted on the stub-shaft 11 for rotation relative thereto by the bearings 14 and 15. It will now be seen that the first sub-assembly of the stub-shaft 11, peg 16, coupling 18 and rotor shaft 20 can rotate freely relative to the second sub-assembly of the housing 21, the housing 23 and the body 24. In this embodiment the first-mentioned sub-assembly is free to rotate, while the other and second sub-assembly is held against rotation but permitted to move freely in directions parallel to the axis of rotation of the screw member 10 by means which will be described below. For convenience in the actual assembly of the various parts and maintenance, the electrical connections from the signal generator are led to a pair of terminal blocks 25 fastened to the external side wall of the housing 23.

A plate support member 26 fastened rigidly to the body 24, e.g. by welding, has two diametrically-opposed extensions 27 which serve as supporting arms for respective guided members 28 working between respective pairs of spaced guideways 29, that are in turn fixed rigidly to a plate 30. Each guided member 28 consists of a pair of ball bearings 31 mounted by respective axles 32 for rotation about the axes that are parallel to each other and also to the axis of rotation of the member 10. One of the bearings is fixed in position but the other is mounted on a tubular slide 33 to enable the bearings to be moved apart and together as required, respectively to engage them with and disengage them from their guideways, the slide being clamped in position when required by a screw fastener 34. The outer races of the bearings 31 press tightly against the guideways 29 to prevent rotation of the plate 26 about the axis of rotation of the member 10, but not so tightly as to prevent free rotation of the bearings so as to accommodate any linear displacement of the plate in the directions of the arrows A in FIG. 2. The bearings are also able to accommodate small displacements thereof in directions parallel to their axes of rotation by sliding along the guideways, but such displacements will always be as small as possible.

In this embodiment the rigidity of the fastening between the body 24 and plate support member 26 is increased by triangular webs 35. A heavy cup-shaped cover 36 for protecting the signal generator and its mounting against physical blows, dirt etc. is bolted to the plate 26.

The plate support members 26 and 30 are connected together firmly but not rigidly by four symmetrically disposed shock absorbers 37, see FIG. 2. The plate also carries two diametrically-oppositely disposed guided members 38 cooperating with respective pairs of support member guideways 39 that are fixed rigidly to a support member such as the main body or mill housing 44 of the rolling mill. The mill housing may be one such as is shown in the aforementioned Canadian Patent 571,793. Each guided member 38 consists of a pair of bearings 40 rotatable on axles 41, one of the bearings being mounted on a tubular slide 42 and provided with a clamp screw 43, as with the guided members 28. The axes of rotation of the bearings 40 are generally perpendicular to the axis of rotation of the screw member 10 and the bearings 40 press tightly against their support member guideways 39 to prevent rotation of the plate 30 about the axis of rotation of the screw member 10, but not so tightly as to prevent their free rotation to accommodate freely the above-mentioned vertical movement of the screw member 10 and the coupling assembly in the directions of the arrows C shown in FIG. 3. Small displacements in the directions of the arrows B in FIG. 2 can be accommodated by the bearings sliding transverse to their direction of rolling displacement.

It will be appreciated that the bearings 31 of the guided members 28 can also be set for rolling displacement in the directions of the arrows C, displacements in the directions of arrows A being accommodated by sliding. However, since the bearings 40 will readily accommodate all the vertical displacement the opportunity is taken of avoiding one of the sliding displacements, even though in practice in this embodiment such displacements are unlikely to exceed 20 thousandths of an inch.

We claim as our invention:

1. In position measurement apparatus operative with a rolling mill screwdown device for positioning at least one of the roll members of that rolling mill, the combination of a screw member operative with one of said roll members to vary the spacing between said roll members, said screw member being rotatable about an axis and movable along said axis, a position sensing device operative with said screw member and movable along said axis, a stationary member and a support member, first movement guide means operatively connected between said support member and said stationary member for permitting movement of said support member relative to said stationary member in at least a first pair of different directions and for preventing rotation of said support member about said axis, second movement guide means operatively connected between said support member and said position sensing device for permitting movement of said position sensing device relative to said support member in at least a second pair of different directions substantially transverse to said first pair of directions and for preventing rotation of said position sensing device about said axis, such that said first and second movement guide means thereby permit movement of said position sensing device relative to said stationary member in at least said first and second pairs of different directions, with each of said pairs of different directions being substantially transverse to said axis.

2. In position control apparatus, the combination of a first member rotatable about an axis and movable along said axis, a second member movable along said axis and not rotatable about said axis, a stationary member and a third member, first movement guide means operative between said third member and said stationary member for permitting movement of said third member relative to said stationary member in at least a first pair of different directions and for preventing rotation of said third member about said axis, second movement guide means operative between said third member and said second member for permitting movement of said second member relative to said third member in at least a second pair of different directions substantially transverse relative to said first pair of directions and for preventing rotation of said second member about said axis, such that said first and second movement guide means are thereby operative to permit movement of said second member relative to said stationary member in at least two pairs of different directions, with each of said pairs of different directions being substantially at right angles relative to the other of said pairs of different directions.

3. In position measurement apparatus, the combination of a first member rotatable about an axis and movable along said axis, a second member movable along said axis and not rotatable about said axis, a stationary member and a third member, first movement guide means operative between said third member and said stationary member for permitting movement of said third member relative to said stationary member in at least a first pair of different directions and for preventing rotation of said third member about said axis, second movement guide means operative between said third member and said second member for permitting movement of said second member relative to said third member in at least a second pair of different directions substantially transverse relative to said first pair of directions and for preventing rotation of said second member about said axis, such that said first and second movement guide means are thereby operative to permit movement of said second member relative to said support member in at least two pairs of different directions, with said second member including position measurement means operative with said first member for measuring the rotational position of said first member.

4. In position measurement apparatus operative with a rolling mill housing having a screwdown device for positioning at least one of the roll members of the rolling mill, the combination of a screw member operative with one of said roll members to vary the spacing between said roll members, said screw member being rotatable about an axis and movable along said axis, a position sensing device operative with said screw member and movable along said axis, first support means and second support means, first movement guide means operatively connected between said second support means and said first support means for permitting movement of said second support means relative to said first support means in at least a first pair of different directions and for preventing rotation of said second support means about said axis, second movement guide means operatively connected between said second support means and said position sensing device for permitting movement of said position sensing device relative to said second support means in at least a second pair of different directions substantially transverse to said first pair of directions and for preventing rotation of said position sensing device about said axis, such that said first and second movement guide means thereby permit movement of said position sensing device relative to said first support means in at least said first and second pairs of different directions, with each of said pairs of different directions being substantially transverse to said axis, said first support means being operatively connected to said mill housing, and said position sensing device being operative to measure the position of said screw member relative to said mill housing.

References Cited in the file of this patent

UNITED STATES PATENTS

| | | |
|---|---|---|
| 529,254 | Fink | Nov. 13, 1894 |
| 612,391 | Ballou | Oct. 18, 1898 |

FOREIGN PATENTS

| | | |
|---|---|---|
| 743,922 | Germany | Jan. 7, 1944 |
| 571,793 | Canada | Mar. 3, 1959 |